US010178565B2

(12) United States Patent
Joung et al.

(10) Patent No.: US 10,178,565 B2
(45) Date of Patent: Jan. 8, 2019

(54) CHANNEL SIMULATOR HAVING FUNCTION OF SUPPORTING CARRIER AGGREGATION AND CARRIER AGGREGATION BLOCK USED FOR THE SAME

(71) Applicant: INNOWIRELESS CO., LTD., Seongnam-si, Gyeonggi-do (KR)

(72) Inventors: Jin Soup Joung, Seongnam-si (KR); Joo Hyeong Lee, Seoul (KR); Yong Hoon Lim, Seoul (KR); Kyoung Hwan Ju, Suwon-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 0 days.

(21) Appl. No.: 15/625,364

(22) Filed: Jun. 16, 2017

(65) Prior Publication Data

US 2018/0213419 A1 Jul. 26, 2018

(30) Foreign Application Priority Data

Jan. 20, 2017 (KR) ........................ 10-2017-0010045

(51) Int. Cl.
| | |
|---|---|
| *H04W 24/06* | (2009.01) |
| *H04B 17/391* | (2015.01) |
| *H04W 72/08* | (2009.01) |
| *H04L 5/00* | (2006.01) |

(52) U.S. Cl.
CPC ........ *H04W 24/06* (2013.01); *H04B 17/3912* (2015.01); *H04L 5/001* (2013.01); *H04W 72/085* (2013.01); *H04B 17/3911* (2015.01); *H04L 5/0037* (2013.01)

(58) Field of Classification Search
CPC ............... H04W 24/06; H04W 72/085; H04B 17/3912; H04B 17/3911; H04L 5/0037
See application file for complete search history.

(56) References Cited

U.S. PATENT DOCUMENTS

| | | | | |
|---|---|---|---|---|
| 2013/0044621 | A1* | 2/2013 | Jung | .................. H04W 72/082 370/252 |
| 2014/0204867 | A1* | 7/2014 | Lim | .................. H04W 72/0413 370/329 |
| 2014/0211741 | A1* | 7/2014 | Panicker | .............. H04J 11/0036 370/329 |

FOREIGN PATENT DOCUMENTS

| | | |
|---|---|---|
| KR | 10-1286023 B1 | 7/2013 |
| KR | 10-1606354 B1 | 3/2016 |

* cited by examiner

*Primary Examiner* — Dady Chery
(74) *Attorney, Agent, or Firm* — Novick, Kim & Lee, PLLC; Jae Youn Kim

(57) ABSTRACT

Provided is a channel simulator having a function of supporting a carrier aggregation and a carrier aggregation block used for the same to support a carrier aggregation function at a minimum path loss without reducing the number of valid connectable terminals. The channel simulator includes: a terminal interface block connected to each of at least four terminals through at least two transmission/reception ports; a carrier aggregation block including unit modules each including one RF coupler and one RF switch, and interposed between the terminal interface block and the terminal to support the carrier aggregation for one to four component carriers; and a management server. The carrier aggregation block includes a front-end carrier aggregation unit and a rear-end carrier aggregation unit.

4 Claims, 5 Drawing Sheets

CHANNEL SIMULATOR HAVING FUNCTION OF SUPPORTING CARRIER AGGREGATION AND CARRIER AGGREGATION BLOCK USED FOR THE SAME

BACKGROUND OF THE INVENTION

1. Field of the Invention

The present invention relates to a channel simulator having a function of supporting a carrier aggregation and a carrier aggregation block used for the same, and more particularly, to a channel simulator having a function of supporting a carrier aggregation and a carrier aggregation block used for the same to support a carrier aggregation function at a minimum path loss without reducing the number of valid connectable terminals.

2. Description of the Related Art

In a multi-path communication channel, line-of-sight components, reflected wave components, diffracted wave components and so on exist between a base station (BS) serving as a transmitter and a terminal (mobile station (MS)) or user equipment (UE) serving as a receiver while simultaneously exerting influences upon each other. Because the signals are received in the terminal through multi-paths and a Doppler spread occurs due to a movement of the terminal, a propagation environment of a mobile communication is inferior to that of a fixed communication.

In general, a Rician channel model is applied to rural and suburban environments where signals of direct paths exist, and a Rayleigh distribution is applied to composite signals supplied through the multi-paths where the direct paths rarely exist.

Because there are various propagation environments existing in a wireless channel, the original performance of a wireless system is required to be properly exhibited in various propagation environments. However, because much time and costs are required for field tests of the developed wireless system in all environmental conditions, a real-time channel simulator is used as a more practical approach, which refers to a system capable of simulating substantially all environments that may actually occur in the wireless channel.

Meanwhile, a fading mainly means a spatial variation with respect to a signal strength, and may be regarded as a temporal variation according to a movement of a terminal.

The fading includes a slow fading or long-term fading such as a free space propagation loss (path loss) or a shade effect in which the intensity of a reception signal is slowly changed when the terminal moves in a wide area, and a fasting fading or short-term fading such as a frequency selective fading, a frequency non-selective fading or a Doppler spread fading in which the intensity of the reception signal is rapidly changed when the terminal moves in a narrow area. In a real environment, the slow fading overlaps with the fast fading.

In the case of the slow fading, only a different delay is applied to a starting signal for each path. In contrast, the fast fading is realized by additionally multiplying the slow fading by a complex gain. Finally, the slow fading and the fast fading are combined and outputted to the terminal or the base station.

The applicant of the present invention has filed a patent application entitled "a large-capacity channel simulator" and registered as Korean Patent Registration No. 1286023 (see the following related art 1), which is configured to easily apply a bi-directional path loss and a bi-directional real-time fading with respect to all paths (P*Q) between P base stations and Q terminals in order to simulate a real channel environment where a plurality of base stations and a plurality of terminals exist and exert influences on each other.

Meanwhile, according to a communication technology standard of 3GPP LTE Release 10, maximally five component carriers each having a frequency bandwidth of 20 MHz can be processed by performing a carrier aggregation (CA) (20 MHz*5=100 MHz). Therefore, an efficient band carrier aggregation is also required for a large-capacity channel simulator where a real environment should be similarly reproduced.

(Patent document 1) Related art 1: Korean Patent Registration No. 10-1286023 entitled "Channel simulator".

(Patent document 2) Related art 2: Korean Patent Registration No. 10-1606354 entitled "Calibration method for channel simulator".

SUMMARY OF THE INVENTION

In order to solve the above problem, an object of the present invention is to provide a channel simulator having a function of supporting a carrier aggregation and a carrier aggregation block used for the same to support a carrier aggregation function at a minimum path loss without reducing the number of valid connectable terminals.

To achieve the above object, the channel simulator having a function of supporting a carrier aggregation of the present invention includes a terminal interface block connected to each of at least four terminals through at least two transmission/reception ports; a carrier aggregation block including a plurality of unit modules each including one RF coupler and one RF switch, and interposed between the terminal interface block and the terminal to support the carrier aggregation for one to four component carriers; and a management server for controlling On/Off of the switch according to a carrier aggregation scenario preset by a user. The carrier aggregation block includes a front-end carrier aggregation unit including four unit modules having a combining function in which two of the unit modules operate together while being connected to the two transmission/reception ports for two arbitrary terminals so as to determine an aggregation with respect to every two component carriers, and a rear-end carrier aggregation unit including two combining unit modules for determining a re-aggregation of the component carriers aggregated in the front-end carrier aggregation unit, and at least two dividing unit modules for copying the component carriers aggregated by the combining unit modules to supply the copied component carriers to a terminal where a signal is disconnected.

According to the aforementioned configuration, the channel simulator of claim 1, wherein the rear-end carrier aggregation unit copies and supplies four component carriers to other terminals.

The rear-end carrier aggregation unit copies and supplies every two component carriers to two mutually different terminals, respectively.

The dividing unit module of the rear-end carrier aggregation unit includes a 1:4 divider having a single input terminal and four output terminals, and the rear-end carrier aggregation unit further includes two switches for distributing signals of the 1:4 divider to arbitrary terminals.

According to another aspect of the present invention, a carrier aggregation block used for the aforementioned channel simulator is provided.

According to a channel simulator having a function of supporting a carrier aggregation and a carrier aggregation block used for the same of the present invention, a base station and a terminal are tested in a state of arbitrarily aggregating the CCs as many as a service provider requires at a minimum path loss without reducing the number of valid connectable terminals, thus time, cost and effort can be remarkably reduced in comparison with direct tests in fields.

DETAILED DESCRIPTION OF THE INVENTION

Hereinafter, a channel simulator having a function of supporting a carrier aggregation and a carrier aggregation block used for the same according to a preferred embodiment of the present invention will be described in detail with reference to the accompanying drawings.

A multiple input and multiple output (MIMO), adopted in various wireless communication standards including 3GPP LTE, is a smart antenna technology for increasing the capacity of wireless communication, and a technology for increasing the capacity in proportion to the number of used antennas by using a plurality of antennas in the base station and the terminal. Herein, the base station means a transmitting terminal and the terminal means a receiving terminal.

In view of this, the channel simulator having a function of supporting a carrier aggregation of the present invention may operate one to four carrier aggregations while changing the carrier aggregations according to scenarios based on a structure for supporting a default 2*2 MIMO, compensate for the reduction in the number of support terminals by using the carrier aggregation, minimize a path loss, and maximize the cost-effectiveness ratio by using minimal parts.

Figure 1:
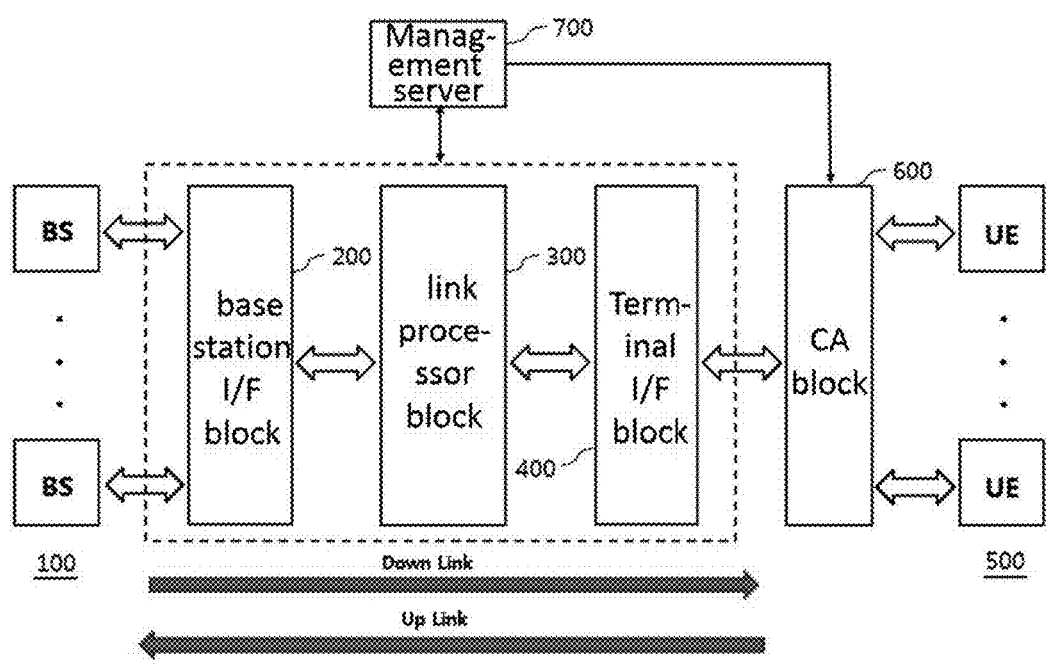
FIG. 1 is a block diagram showing a channel simulator having a function of supporting a carrier aggregation according to the present invention.

FIG. 1 is a block diagram showing a channel simulator having a function of supporting a carrier aggregation according to the present invention. Hereinafter, the term 'block' is used only for distinguishing the configurations of the present invention based on functions, and the term is not used for limiting a size or range. As shown in FIG. 1, the channel simulator of the present invention may include a base station interface block 200 configured to output a digital-type downlink baseband signal obtained by down-converting and A/D-converting an RF downlink signal inputted from a plurality of base stations 100 to a link processor block 300, and output an RF uplink signal obtained by D/A converting and up-converting a digital-type uplink baseband signal fading-processed in real-time and outputted from the link processor block 300 to a corresponding base station 100; the link processor block 300 for fading processing, in other words, slow fading and fast fading processing a digital-type downlink baseband signal in real-time inputted from the base station interface block 200 to output the processed downlink baseband signal to a terminal interface block 400, and reversely, for fading processing a digital-type uplink baseband signal in real-time inputted from the terminal interface block 400 to output the processed uplink baseband signal to the base station interface block 200; a terminal interface block 400 configured to output a digital-type uplink baseband signal obtained by down-converting and A/D-converting an RF uplink signal inputted from a plurality of terminals 500 to a link processor block 300, and output an RF downlink signal obtained by D/A converting and up-converting a digital-type downlink baseband signal fading-processed and outputted in real-time from the link processor block 300 to a corresponding terminal 500; and a management server 700 connected to each of the above blocks through an Ethernet and so on to control each block of the simulator according to various test scenarios preset by the user. The configuration of the channel simulator according to the related art 1 has been described above. The aforementioned management server 700 is described according to a functional configuration, and may be further divided in detail based on density, separation distance, efficiency or the like in an actual configuration.

According to the present invention, the carrier aggregation block 600 is additionally provided between the terminal interface block 400 and the terminals 500 to provide a carrier aggregation function to the above channel simulator.

Figure 2:
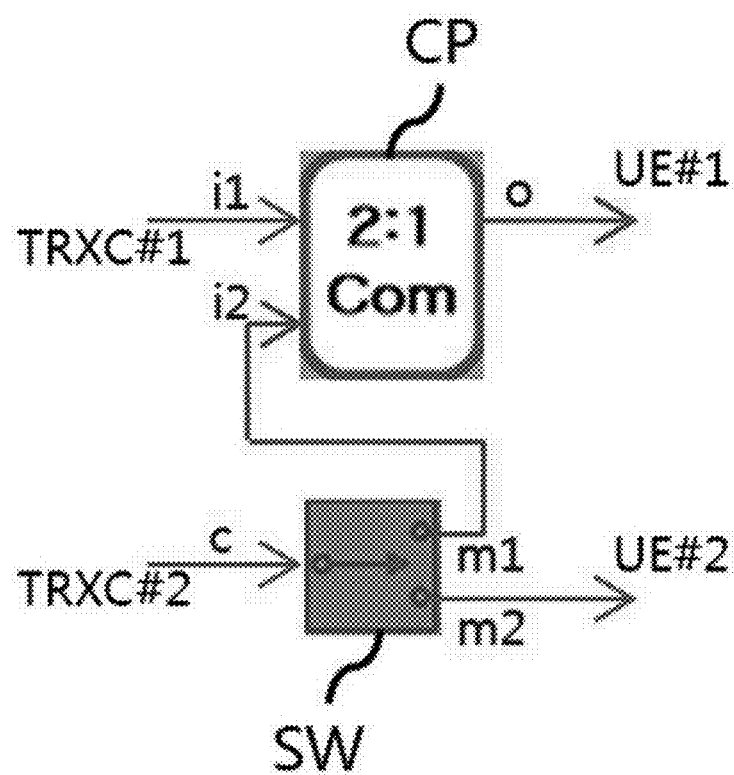
FIG. 2 is a schematic view showing a unit module of a carrier aggregation block of a channel simulator according to the present invention.

FIG. 2 is a schematic view showing a unit module of a carrier aggregation block of a channel simulator according to the present invention. the carrier aggregation block of the present invention may include a plurality of unit modules mutually connected and each including one RF coupler (hereinafter referred to as "coupler" (CP)) and one RF switch (hereinafter referred to as "switch" (SW)). According to the configuration of FIG. 2, the coupler CP, for example, a coupler having 3 dB, operates as a power combiner, one input terminal i1 thereof is connected to an arbitrary transmission/reception port TRXC#1 of the terminal interface block (hereinafter referred to as a "terminal I/F block") 400, and a common contact c of the switch SW is connected to another transmission/reception port TRXC#2 of the terminal I/F block 400.

Another input terminal i2 of the coupler CP is connected to a first movable contact m1 of the switch SW, an output terminal o of the coupler CP is connected to an arbitrary terminal UE#1, and a second movable contact m2 of the switch SW is connected to another terminal UE#2.

According to the aforementioned configuration, when the switch SW is Off, in other words, when the common contact c is connected to the second movable contact m2, the two transmission/reception ports TRXC#1 and TRXC#2 are connected to the two different terminal UE#1 and UE#2, respectively, thus the carrier aggregation function is deactivated. In the above state, when the carrier aggregation function is activated, in other words, when the switch SW is On, the common contact c of the switch SW is connected to the first movable contact m1, thus, output signals of the two transmission/reception ports TRXC#1 and TRXC#2 of the terminal I/F block 400 are coupled by the coupler CP, in other words, two CCs are carrier-aggregated, so that the aggregated CCs are outputted to one terminal UE#1, and any other signal is not outputted to the other terminal UE#2. The results are shown in Table 1 as follows.

TABLE 1

| Switch status | Transmission/reception port connected to terminal #1 (UE#1) | Transmission/reception port connected to terminal #2 (UE#2) |
| --- | --- | --- |
| Off | TRXC#1 | TRXC#2 |
| On | TRXC#1 + TRXC#2 | — |

Figure 3:
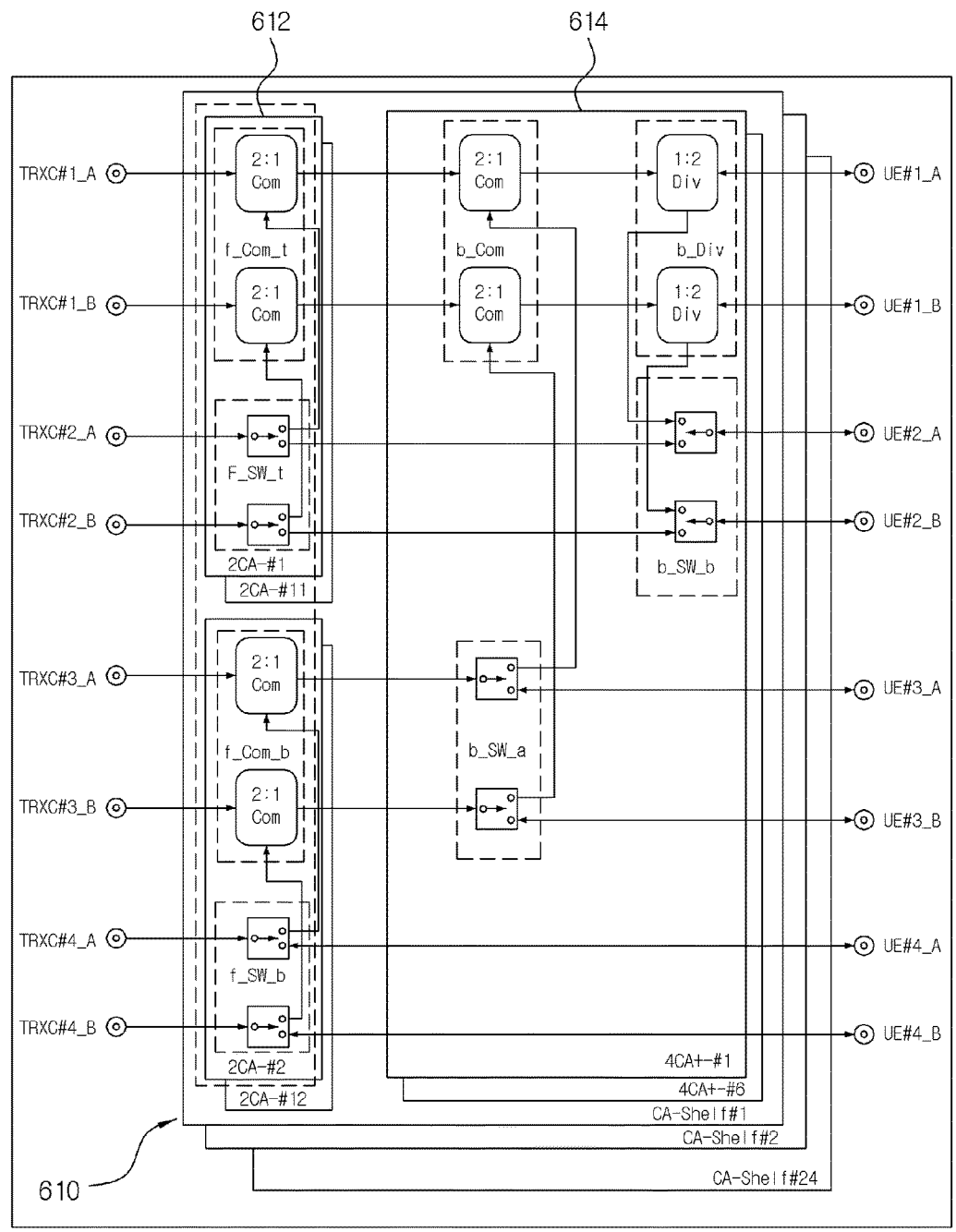
FIG. 3 is a view showing an internal configuration of a carrier aggregation block of a channel simulator according to an embodiment of the present invention.

FIG. 3 is a view showing an internal configuration of a carrier aggregation block of a channel simulator according to an embodiment of the present invention. As shown in FIG. 3, because the channel simulator of the present invention supports 2*2 MIMO as a default, each terminal and the transmission/reception port of the terminal I/F block 400 connected to the terminal include two ports A and B, for example, UE#1_A and UE#1_B, and TRXC#1_A and TRXC#1_B in response to a first terminal, respectively.

In this regard, the carrier aggregation block 600 of the channel simulator of the present invention may be configured by using two (a pair of) unit modules, in other words, by using two couplers and two switches, shown in FIG. 2 per one CC so as to support 2*2 MIMO as a default, thus total six pairs of unit modules are used in response to four terminals to support total four CCs.

Specifically, the carrier aggregation block 600 according to an embodiment of the present invention may include four pairs of unit modules for aggregating two CCs in response to every four terminals, in other words, a front-end carrier aggregation unit 612 including four couplers and four switches, and a rear-end carrier aggregation unit 614 including two pairs of unit modules for re-aggregating signals aggregated in the front-end carrier aggregation unit 612.

As a result, when one CC based on 2*2 MIMO is used in the channel simulator, for example, when 570 terminals may be connected, approximately 142 ($\approx$570/4) front-end carrier aggregation units 612 and rear-end carrier aggregation units 614 are required for each. In addition, the front-end carrier aggregation units 612 and rear-end carrier aggregation units 614 may be distributed and arranged in 24 shelves 610 in plural, for example, by six bundles.

Each of the couplers serves as a combiner Com in each of the front-end carrier aggregation unit 612 including four pairs of unit modules, and two adjacent switches are formal switches (described later) that are simultaneously turned On or Off. Hereinafter, the coupler will be described as a combiner Com or a divider Div if it is necessary for clear explanation.

Specifically, two transmission/reception ports TRXC#1_A and TRXC#1_B, and TRXC#3_A and TRXC#3_B are connected to a single input terminal of each combiner f_Com_t and f_Com_b of the front-end carrier aggregation unit 612 with respect to two arbitrary terminals UE#1 and UE#3 of the terminal I/F block 400, respectively, and two transmission/reception ports TRXC#2_A and TRXC#2_B, and TRXC#4_A and TRXC#4_B are also connected to common contacts of each switch f_SW_t and f_SW_b with respect to two arbitrary terminals UE#2 and UE#4, respectively. Each of the first movable contacts of the switch f_SW_t and f_SW_b is connected to one input terminal of each of the combiner f_Com_t and f_Com_b.

Meanwhile, as described above, when each of 570 valid terminals using one CC based on 2*2 MIMO uses four CCs, the number of the valid terminals is reduced to approximately 142 ($\approx$570/4). More severely, when 8*2 MIMO is adopted, the number of the valid terminals is remarkably reduced to approximately 35 ($\approx$142/4), thus the use efficiency of the simulator is rapidly decreased.

According to the present invention, in order to compensate for the decrease, a pair of unit modules d-Div and b-SW-b operating as a divider are additionally provided at a rear end of the pair of unit modules of the rear-end carrier aggregation unit 614, to copy and supply the previously aggregated signal to the terminal where signals are disconnected, thereby compensating for the number of valid terminals used through connection with the simulator regardless of the carrier aggregation.

More specifically, each of the output terminals of an upper combiner f_Com_t of the front-end carrier aggregation unit 612 is connected to one input terminal of each combiner b-Com of the rear-end carrier aggregation unit 614, and output terminals of lower combiners f_Com_b of the front-end carrier aggregation unit 612 are connected to common contacts of two switches b-Com of the rear-end carrier aggregation unit 614, respectively. Hereinafter, a switch where the common contact is positioned on the left side thereof is referred to as a "formal switch", and a switch where the common contact is positioned on the right side thereof is referred to as an "inversion switch". Two adjacent switches of the rear-end carrier aggregation unit 614 are also simultaneously turned On or Off.

First movable contacts of the formal switch b-SW-a of the rear-end carrier aggregation unit 614 are connected to the other input terminals of the combiner b-Com of the rear-end carrier aggregation unit 614, respectively. The output terminals of the combiner b-Com are connected to single input terminals of two dividers b-Div connected to rear end of the output terminals, respectively, and one output terminal of the divider b-Div is connected to a first movable contact of an inversion switch b-SW-b. A second movable contact of an upper switch f_SW_t of the front-end carrier aggregation unit 612 is connected to a second movable contact of the inversion switch b-SW-b connected to a rear end of the second movable contact of the upper switch f_SW_t.

Output terminals of the divider b-Div are connected to the first terminals UE#1_A and UE#1_B, respectively, and common contacts of the inversion switch b-SW-b are connected to the second terminals UE#2_A and the UE#2_B, respectively. Second movable contacts of the formal switch b-SW-a are connected to the third terminals UE#3_A and the UE#3_B, respectively, and second movable contacts of s lower switch f_SW_b of the front-end carrier aggregation unit 612 are connected to the fourth terminals UE#4_A and UE#4_B, respectively.

The operations of the aforementioned carrier aggregation block are summarized in Table 2 as follows.

TABLE 2

| The number of CCs | Switch | Remarks |
| --- | --- | --- |
| 1 | f_SW_t, f_SW_b, b_SW_a, b_SW_b = Off | Transmission/reception ports are connected to the terminals one to one. |
| 2 | f_SW_t, f_SW_b = On, b_SW_a = Off, b_SW_b = On or Off | Signals of the transmission/reception ports of the first and second terminals and signals of the third and fourth transmission/reception ports are aggregated into two signals and outputted to the first and third terminals, respectively. When b_SW_b is Off, the signals for the second and fourth terminals are cut, however, when b_SW_b is On, a signal the same as that of the first terminal is copied and outputted to the second terminal. |

TABLE 2-continued

| The number of CCs | Switch | Remarks |
|---|---|---|
| 4 | f_SW_t, f_SW_b, b_SW_a = On, b_SW_b = On or Off | All signals of the transmission/reception ports of the first to fourth terminals are aggregated and output to the first terminal. The signals are disconnected to the third and fourth terminals. When b_SW_b is Off, the signal is disconnected to the second terminal, however, when b_SW_b is On, a signal the same as that of the first terminal is copied and outputted to the second terminal. |

In addition, the On/Off state of each of the aforementioned RF switches is automatically controlled and changed by the management server 700 according to the test scenario preset by the user.

Figure 4:
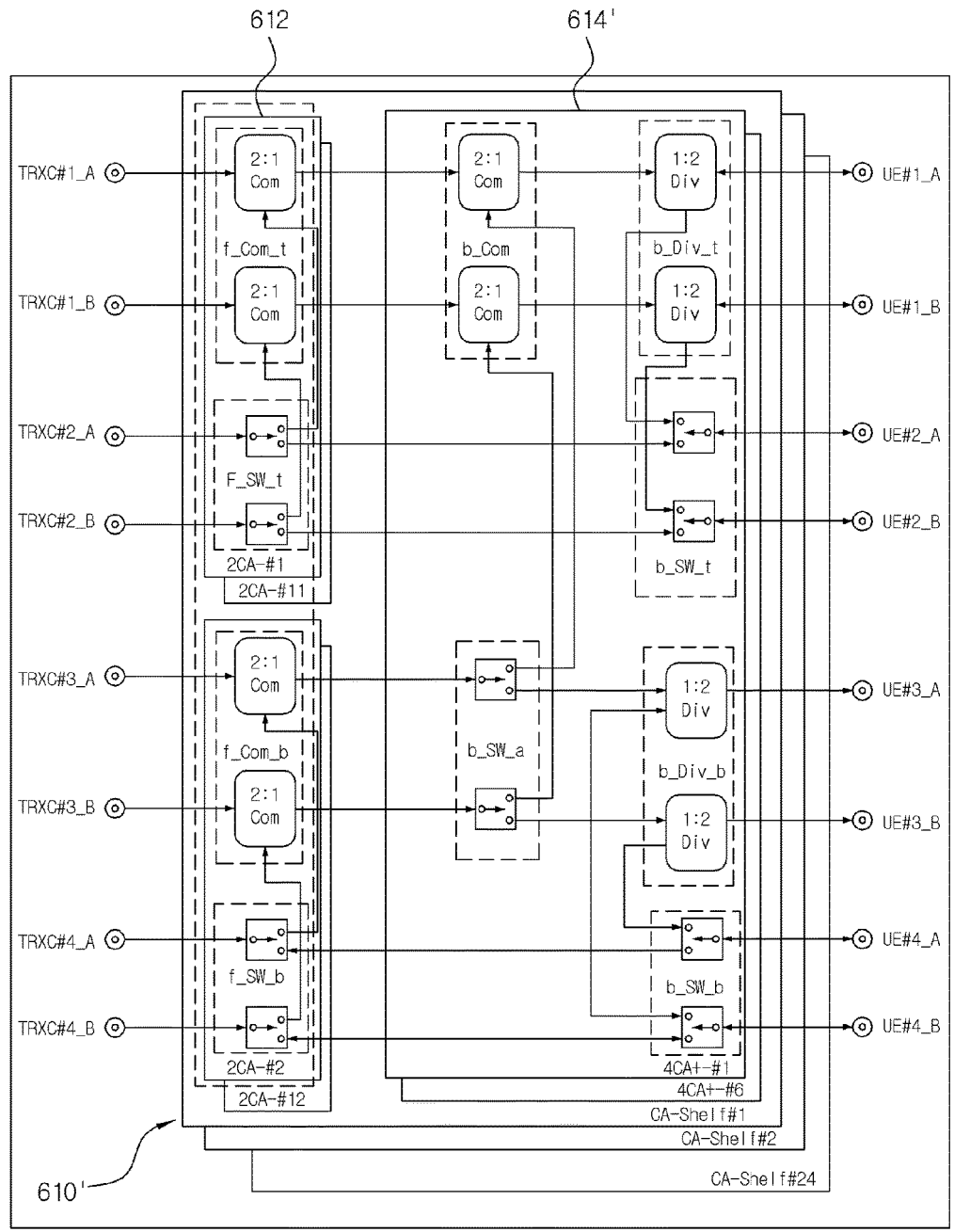
FIG. 4 is a view showing an internal configuration of a carrier aggregation block of a channel simulator according to another embodiment of the present invention.

FIG. 4 is a view showing an internal configuration of a carrier aggregation block of a channel simulator according to another embodiment of the present invention, in which an inversion switch b_SW_b and the divider b_Div_b provided above the inversion switch b_SW_b are additionally provided at a rear end of the formal switch b_SW_a shown in the rear-end carrier aggregation unit in the embodiment of FIG. 3. Specifically, the second movable contact of the formal switch b_SW_a of a rear-end carrier aggregation unit 614' is connected to a single input terminal of the lower divider b_Div_b, and one output terminal of the lower divider b_Div_b is connected to a second movable contact of the lower inversion switch b_SW$_{13}$ b. The second movable contact of the lower switch f_SW$_{13}$ b of the front-end carrier aggregation unit 162 is connected to the second movable contact of the lower inversion switch b_SW_b, and the common contact of the lower inversion switch b_SW_b is connected to the fourth terminal. The other output terminal of the lower divider b_Div_b is connected to the third terminal.

According to an embodiment of FIG. 4, when two CCs are aggregated by the copy function through the two dividers b_Div_t and b_Div_b and the two switches b_SW_t and b_SW_b of the rear-end carrier aggregation unit 614', all terminals may be effectively used.

The results are shown in Table 3 as follows.

TABLE 3

| The number of CCs | Switch | Remarks |
|---|---|---|
| 1 | f_SW_t, f_SW_b, b_SW_a, b_SW_t, b_SW_b = Off | Transmission/reception ports are connected to the terminals one to one. |
| 2 | f_SW_t, f_SW_b = On, b_SW_a = Off, b_SW_t, b_SW_b = On or Off | Signals of the transmission/reception ports of the first and second terminals and signals of the third and fourth transmission/reception ports are aggregated into two signals and outputted to the first and third terminals, respectively. When both b_SW_t and b_SW_b are On, signals the same as those of the first and third terminals are copied and outputted to the second and fourth terminals, respectively (four valid terminals). |

TABLE 3-continued

| The number of CCs | Switch | Remarks |
|---|---|---|
| 4 | f_SW_t, f_SW_b, b_SW_a = On, b_SW_t = On or Off | All signals of the transmission/reception ports of the first to fourth terminals are aggregated and output to the first terminal. Signals are disconnected to the third and fourth terminals. When b_SW_t is Off, a signal is disconnected to the second terminal. However, when b_SW_t is On, a signal the same as that of the first terminal is copied and outputted to the second terminal (two valid terminals). |

Figure 5:
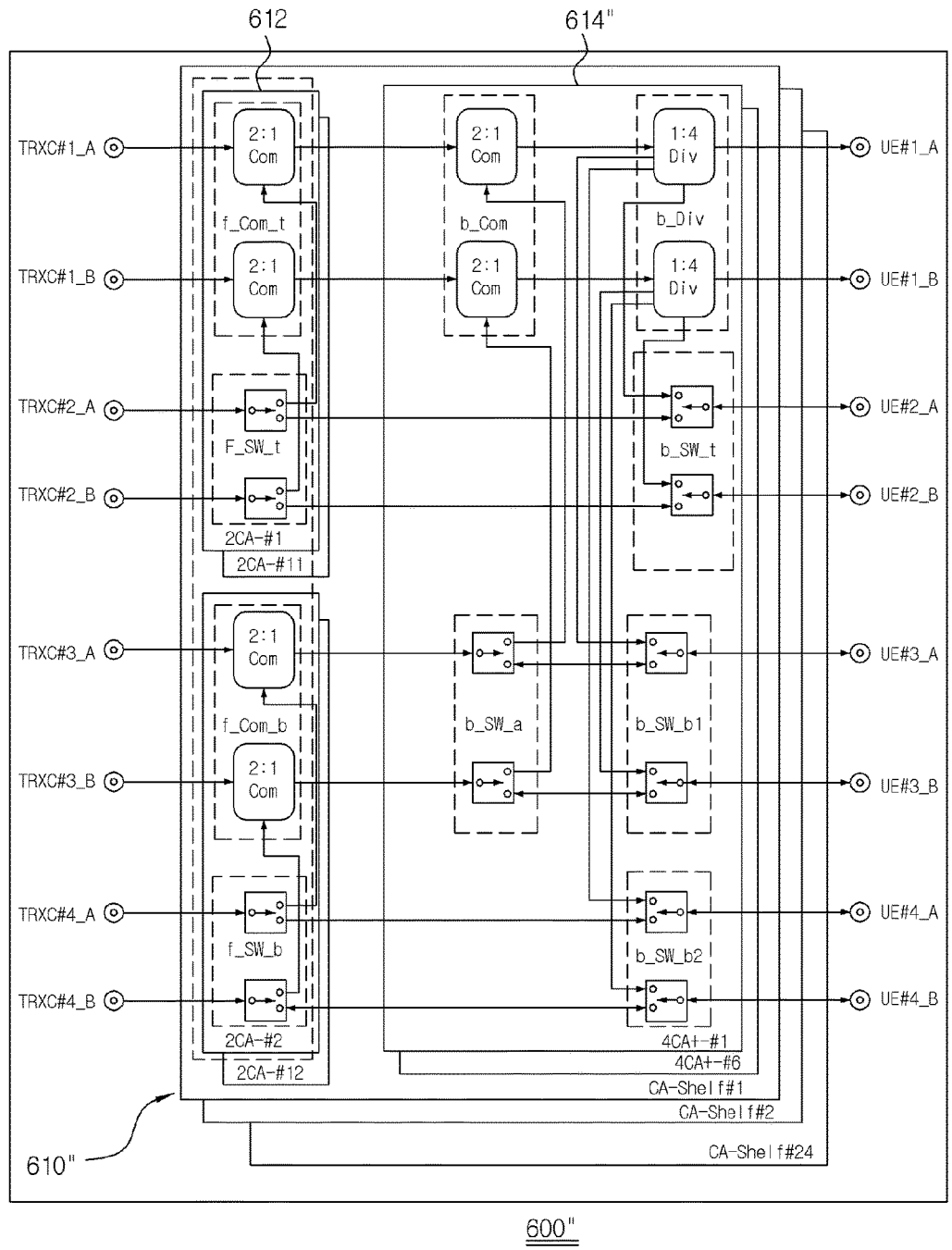
FIG. 5 is a view showing an internal configuration of a carrier aggregation block of a channel simulator according to still another embodiment of the present invention.

FIG. 5 is a view showing an internal configuration of a carrier aggregation block of a channel simulator according to still another embodiment of the present invention. The rear-end carrier aggregation unit 614" adopts a 4:1 divider in comparison with FIG. 3, and further includes two pairs of the inversion switches b_SW_b1 and b_SW_b2, so that desired arbitrary signals may be copied and output to a desired terminal.

Specifically, a second movable contact of the formal switch b_SW_a of the rear-end carrier aggregation unit 614" is connected to a second movable contact of the lower first inversion switch b_SW_b1, and the second movable contact of the lower switch f_SW_b of the front-end carrier aggregation unit 612 is connected to a second movable contact of the lower second inversion switch b_SW_b2.

First movable contacts of the lower first inversion switch b_SW_b1 and the second inversion switch b_SW_b2 are connected to the output terminals of the divider b_Div, respectively, and the common contacts of the lower first inversion switch b_SW_b1 and the second inversion switch b_SW_b2 are connected to the third and fourth terminals, respectively.

The operations are summarized in Table 4 as follows.

TABLE 4

| The number of CCs | Switch | Remarks |
|---|---|---|
| 1 | f_SW_t, f_SW_b, b_SW_a, b_SW_t, b_SW_b1, b_SW_b2 = Off | Transmission/reception ports are connected to the terminals one to one. |
| 2 | f_SW_t, f_SW_b = On, b_SW_a, b_SW_b1 = Off, b_SW_t, b_SW_b2 = On or Off | Signals of the transmission/reception ports of the first and second terminals and signals of the third and fourth transmission/reception ports are aggregated into two signals and outputted to the first and third terminals, respectively. When b_SW_t is On, a signal the same as that of the first terminal is copied and output to the second terminal. When b_SW_b2 is On, a signal the same as that of the first terminal is copied and outputted to the fourth terminal (four valid terminals). |
| 4 | f_SW_t, f_SW_b, b_SW_a = On, b_SW_t, b_SW_b1, b_SW_b2 = On or Off | All signals of the transmission/reception ports of the first to fourth terminals are aggregated and output to the first terminal. When b_SW_t, b_SW_b1 and b_SW_b2 are separately On, signals the same as that of the first terminal are copied and outputted to the second, third, and fourth terminals (maximally four valid terminals). |

Meanwhile, the signal attenuation is avoidable only when the minimum path loss for each CC is maintained. Because a plurality of RF elements such as a plurality of couplers and switches are used in the channel simulator of the present invention, the loss inevitably occurs due to an insertion loss and the like.

The CC loss is summarized in the following Table 5 based on the embodiment of FIG. 3.

TABLE 5

| The number of CCs | Path loss (dB) | | | | Remarks |
|---|---|---|---|---|---|
| | TRXC#1 | TRXC#2 | TRXC#3 | TRXC#4 | Coupler insertion loss = 3.5 dB Cable insertion loss = 1 dB Switch insertion loss = 0.75 dB |
| 1 | 3.5*3 + 1 | 0.75*2 + 1 | 3.5 + 0.75 + 1 | 0.75 + 1 | When a signal is not copied |
| 2 | 3.5*3 + 1 | 3.5*3 + 1 + 0.75 | 3.5 + 0.75 + 1 | 3.5 + 0.75*2 + 1 | The terminal loss of the signal copy is increased by 0.75 dB |
| 4 | 3.5*3 + 1 | 3.5*3 + 1 + 0.75 | 3.5*3 + 0.75 + 1 | 3.5*3 + 0.75*2 + 1 | The terminal loss of the signal copy is increased by 0.75 dB |

Meanwhile, in order to support M*N MIMO based on 2*2 MIMO as a default, the default transmission/reception port TRXC of the adjacent 2*2 MIMO is required to be easily merged to a narrow space where N antennas of the terminal are physically gathered regardless of the CC.

Accordingly, the proposed basic structure may be implemented based on four 2*2 transmission/reception ports, thereby being easily expandable for an arbitrary M*N MIMO.

Although the present invention described in detail with reference to the accompanying drawings is just one embodiment for carrying out a channel simulator having a function of supporting a carrier aggregation and a carrier aggregation block used for the same, the present invention is not limited thereto, and it will be apparent that various substitutions, deformations and modifications are available within the scope without departing from the idea of the invention. Therefore, the scope of the present invention should be defined by the following claims.

What is claimed is:

1. A channel simulator for supporting a carrier aggregation, the channel simulator comprising:
    a terminal interface block connected to a plurality of terminals through a plurality of transmission/reception ports;
    a carrier aggregation block including a plurality of circuits each having a RF coupler and a RF switch, and interposed between the terminal interface block and the terminals to support the carrier aggregation for at least one component carrier; and
    a management server for controlling On/Off of the RF switch according to a carrier aggregation scenario preset by a user,
    wherein the carrier aggregation block comprises,
        a front-end carrier aggregation sub-block including a plurality of combining circuits in which two of the combining circuits operate together while being connected to two transmission/reception ports for two arbitrary terminals so as to determine an aggregation with respect to every two component carriers; and
        a rear-end carrier aggregation sub-block including a plurality of combining circuits for determining a re-aggregation of the component carriers aggregated in the front-end carrier aggregation sub-block, and a plurality of dividing circuits for copying the component carriers aggregated by the combining circuits to supply the copied component carriers to a terminal where a signal is disconnected.

2. The channel simulator of claim 1, wherein the rear-end carrier aggregation sub-block copies and supplies four component carriers to other terminals.

3. The channel simulator of claim 2, wherein the rear-end carrier aggregation sub-block copies and supplies every two component carriers to two mutually different terminals, respectively.

4. The channel simulator of claim 2, wherein the dividing circuit of the rear-end carrier aggregation sub-block comprises a 1:4 divider having a single input terminal and four output terminals, and the rear-end carrier aggregation sub-block further comprises two switches for distributing signals of the 1:4 divider to arbitrary terminals.

* * * * *